TAPE TRANSPORT APPARATUS

Filed April 20, 1964

INVENTORS
MICHAEL B. ALTOBELLI
JOHN M. O'BRIEN
BY Spencer E. Olson
ATTORNEY

United States Patent Office 3,258,184
Patented June 28, 1966

3,258,184
TAPE TRANSPORT APPARATUS

Michael B. Altobelli, Lexington, and John M. O'Brien, Stoneham, Mass., assignors to Sylvania Electric Products Inc., a corporation of Delaware Filed Apr. 20, 1964, Ser. No. 360,896
3 Claims. (Cl. 226—95)

This invention is concerned with tape transporting apparatus and more specifically with a capstan for use in such apparatus.

An essential feature of tape transporting apparatus of the type shown and described in United States Pat. No. 3,122,295 is a capstan which will insure fast and reliable starting and stopping of the tape. The tape system described in that patent comprises a pair of oppositely rotating capstans, a pair of manifold-valve assemblies, each positioned adjacent a respective capstan, a pair of tape reels, and a read-record head positioned adjacent the tape between the two capstans. The capstans are constantly driven in rotation, in opposite directions, and each, together with its respective manifold, forms a passage through which the tape is carried. Upon command, a valve in one of the manifolds is opened, releasing air under pressure from the manifold which forces the tape against the rotating capstan. The tape is held away from the other counter-rotating capstan by an air cushion developed by the high speed rotation of the capstan to thereby substantially eliminate drag of the tape. However, to insure substantially instantaneous and smooth start characteristics, when the originally non-driving capstan is commanded to drive the tape, it is essential that the air bearing between the tape and the capstan be rapidly collapsed so as to allow the tape to be forced into contact with the capstan.

Among a number of available capstan configurations useful in this system is the claimed subject matter of the aforementioned patent. Another capstan design of which applicants are aware is characterized by a plurality of equally spaced open-ended grooves cut in the surface of the capstan to form a like plurality of projecting keys or splines disposed perpendicular to the direction of tape motion. These designs are both quite satisfactory for accomplishing the function of collapsing the air bearing between the tape and the driving capstan upon occurrence of the drive command because the air in the grooves between the splines and the thin cushion of air between the tape and the outer surface of the splines is readily exhausted from the open ends of the grooves. However, these capstan designs do not satisfactorily perform the function of creating and maintaining a sufficient air bearing between the non-driving capstan and the tape to adequately eliminate the drag of the tape on the non-driving capstan. Because the ends of the grooves are fully open, the air bearing between the tape and the non-driving capstan escapes too readily, allowing the moving tape to occasionally contact the capstan and cause a drag force on the tape. In other words, a capstan configuration which provides excellent performance of the driving capstan causes intolerable drag on the non-driving capstan.

The drag on the non-driving capstan can be reduced to an acceptable amount through the use of another previously available capstan configuration in which the ends of the grooves of a splined capstan are completely closed off. This construction traps air in the grooves and produces an excellent air bearing between the tape and the non-driving capstan, but the closed ends prevent a sufficiently rapid collapse of the air cushion on the driving capstan thereby limiting the start time of the system.

But for the fact that tape handling systems of the kind here under discussion desirably have a bi-directional tape driving capability, the abovedescribed difficulties could be overcome by using a splined capstan with open-ended grooves for driving and one having grooves with closed ends for the non-driving capstan. Also, from a cost point of view, it is desirable that the capstans be interchangeable.

Accordingly, a general object of this invention is to improve the start and stop characteristics of tape transport apparatus.

Another object of the invention is to provide an improved capstan for tape transport apparatus of the type described hereinabove.

A more specific object of the invention is to provide a capstan design that is effective to maintain a suitable air bearing between it and the tape while it is not driving the tape, yet allows the air bearing to rapidly collapse when air pressure is applied to the other side of the tape to force it into driving engagement with the capstan.

These and other objects are accomplished, according to the invention, by a cylindrical capstan which features a plurality of parallel grooves forming a like plurality of projecting splines or keys in its surface which are oriented perpendicularly to the direction of tape motion. The axial length of the capstan is substantially equal to the width of the tape and both ends of each of the grooves are closed except for a very small space or orifice, of the order of .001 inch in the preferred embodiment, between the top of the groove closure and the outer periphery of the splines. By essentially closing the ends of the grooves, the air bearing generated by the rotation of the non-driving capstan is effectively trapped or confined within the grooves and maintains an air cushion between it and the tape sufficient to prevent deleterious drag on the tape. On the other hand, the small orifice defined by the tape and the top of the closure when the tape is forced toward the capstan by the application of air pressure to the opposite side of the tape has been found to allow sufficiently rapid collapse of the air bearing upon application of air pressure from the manifold to give a smooth and substantially instantaneous start of the tape. Thus, the same capstan design can be used for both the driving and non-driving capstans, providing an acceptable compromise between the fast start requirement of the driving capstan on the one hand and the elimination of drag on the non-driving capstan on the other.

Other objects, features and advantages of the invention, and a better understanding of its construction and operation, will be apparent from the following detailed description of a preferred embodiment and reference to the accompanying drawings, in which.

Figure 1:
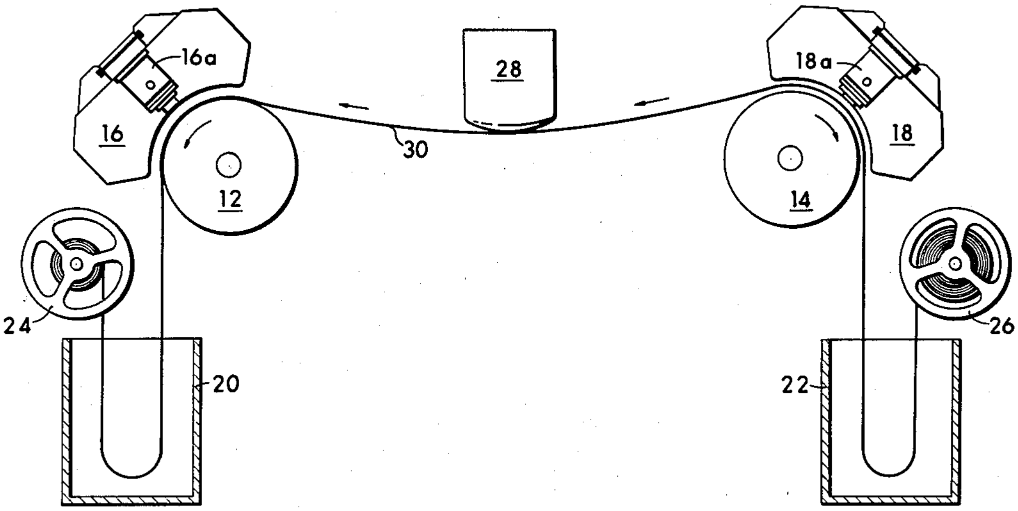
FIG. 1 is a schematic representation of a tape transport system in which the capstan of the invention has utility.

Referring to FIG. 1, a tape drive system in which the capstan of the invention has particular utility is shown as comprising a pair of oppositely rotating capstans 12 and 14, a pair of manifold-valve assemblies 16 and 18, each positioned adjacent a respective capstan, a pair of vacuum wells 20 and 22, a pair of tape reels 24 and 26, and a read-record head 28 positioned adjacent the path of travel of the tape 30 between the capstans 12 and 14.

The manifold-valve assembly 16 cooperates with capstan 12, and the other manifold-valve assembly 18 cooperates with the other capstan 14, to form passages through which the tape 30 is drawn as it is transported between the two takeup reels 24 and 26. Motion is imparted to the tape by forcing air under pressure from one of the manifolds against the surface of the tape causing it to be engaged by the driven capstan. For example, when the valve 16*a* of the manifold-valve assembly 16 is actuated, the tape is forced against the capstan 12 and rectilinear motion, in the direction indicated by the arrows, is imparted to the tape. Only one of the valves being actuated at any one time, the tape in moving in the direction indicated is carried through the passage between manifold 18 and capstan 14 substantially without restriction, except for such drag as is caused by the rotation of capstan 14 in a direction opposite to the direction of tape travel. The system being intended for substantially instantaneous starting and stopping of the tape, the buffer wells 20 and 22 are provided to prevent tape breakage which might otherwise occur from the rapid acceleration and deceleration of the tape reels. Although the tape is shown as being driven from right to left, it will, of course, be understood that if the valve 18*a* and the manifold-valve assembly 18 is actuated, and the air pressure removed from the tape passing over capstan 12, the tape will be driven in the opposite direction.

When the tape is driven in the direction indicated, the rotation of non-driving capstan 14 in the opposite direction generates a cushion of air between the capstan and the tape which tends to hold the tape away from the capstan. Thus, the tape is drawn through the passage between capstan 14 and its associated manifold without significant physical contact with either the capstan or the manifold structure. Were it not for this air cushion, the tape in passing over the contra-rotating capstan would experience considerable wear and a drag which would have to be overcome by the driving capstan 12. While the air cushion is of advantage in the case of the non-driving capstan, it interferes with the starting capability of a previously non-driving capstan when it suddenly becomes the driving capstan. Before capstan 14 can engage and drive the tape in the direction opposite to that indicated, the air cushion must be collapsed to allow the tape to be forced into intimate contact with the capstan.

Figure 2:
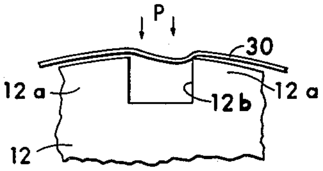
FIG. 2 is a fragmentary end view of our prior art capstan, illustrating a deficiency of a capstan having open-ended grooves.
Figure 3:
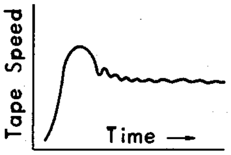
FIG. 3 is a plot of the starting characteristics of a capstan of the type shown in FIG. 2.
Figure 4:
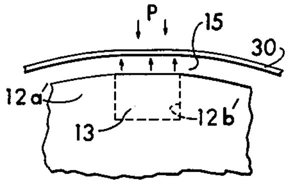
FIG. 4 is a fragmentary end view of a splined capstan on which the grooves are completely closed at both ends.

The aforementioned shortcomings of the capstan configurations heretofore proposed to overcome this conflict in requirements between the driving and non-driving capstans will best be understood from the following consideration of FIGS. 2, 3 and 4. FIG. 2 is a fragmentary end view of a capstan of the type having parallel grooves in its surface which are co-extensive with the axial length of the capstan; i.e., the grooves are open at both ends. More particularly, and assuming that FIG. 2 represents a portion of the driving capstan 12 of FIG. 1, the periphery of the capstan has in the surface thereof a plurality of grooves 12*b* of rectangular cross-section separated by a plurality of splines or ridges 12*a*. Both ends of each of the grooves is completely open whereby the air cushion generated between the capstan and the tape 20 when valve 16*a* is unenergized rapidly collapses into and out of the ends of the groove 12*b* upon application of air pressure to the opposite side of the tape, allowing the tape to be forced into intimate contact with the capstan. The rapid exhaust of the air cushion from the ends of the grooves allows the capstan to engage the tape substantially instantaneously upon actuation of valve 16*a*, but it has been found that the start characteristic of the capstan is somewhat irregular, probably due to the tape being depressed slightly into the grooves 12*b* as shown in FIG. 2. This depression in the tape is evidently due to an instantaneous complete collapse of the air bearing in the groove, which causes the capstan to firmly engage the tape and rapidly accelerate it to a speed in excess of the design speed of the system. Following this initial thrust, the air cushion within the grooves 12*b* evidently is restored and the tape speed settles down to design value. The curve of FIG. 3 illustrates the overshoot and otherwise irregular starting characteristic of the tape when a grooved capstan, with the ends of the grooves completely open, is used. Besides contributing to irregular starting, the engagement of the tape with the edges of the groove 12*b* contributes to excessive wear.

When a capstant of the type shown in FIG. 2 is not driving, the grooves and splines in rotating past the tape in a direction opposite to the tape motion create a turbulence in the air to form an air cushion between the outer surface of the splines and the tape. It has been found, however, that this bearing tends to collapse, probably due to the ease with which air is exhausted through the ends of the grooves, allowing the tape to intermittently come in physical contact with the capstan. This condition introduces an intolerable drag on the tape, and also contributes to tape wear.

To overcome these deficiencies of the capstant having open ended grooves, it has been proposed that the grooves be retained to produce the necessary turbulence to generate the air cushion and to provide the necessary frictional engagement between the driving capstan and the tape, but that the ends of the grooves be completely closed as shown in FIG. 4, to prevent the escape of the air cushion. Except for the closure 13 over the ends of the grooves 12*b'* the capstan configuration of FIG. 4 is the same as that of FIG. 2. The construction of FIG. 4 has been found very effective in maintaining the air bearing between the non-driving capstan and the tape, and to reduce drag to substantially zero, but, unfortunately, it is ineffective as a driving capstan. When air pressure from the manifold is applied to the upper side of the tape 20, the thin film of air between the tape and the outer surface of the splines is undoubtedly exhausted but the air trapped within the grooves 12*b'* escapes so slowly that an air bearing is at least momentarily maintained, preventing intimate contact of the capstan and the tape and interfering with the rapid starting of the tape.

Figure 5A:
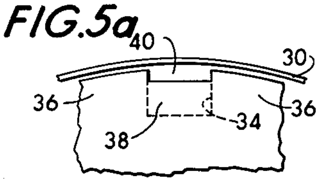
FIG. 5A is an enlarged fragmentary end view of FIG. 5 showing the invention in more detail.
Figure 5:
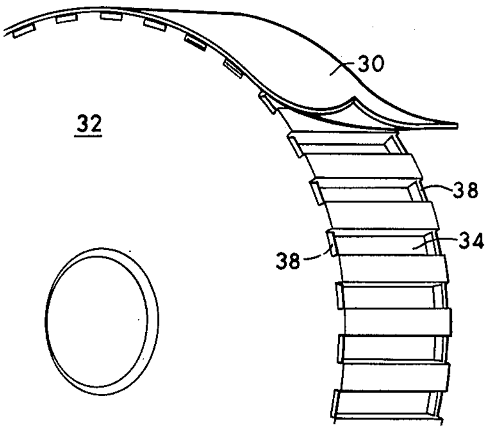
FIG. 5 is a fragmentary isometric view, greatly enlarged, of a capstan embodying the present invention.

The present invention represents a compromise between the designs of FIGS. 2 and 4 to provide a capstan which gives rapid and smooth starting characteristics when used as the driving capstan while offering minimum drag when it is in the non-driving condition. Referring to FIGS. 5 and 5A, the present capstan comprises a cylindrical body 30 having parallel end faces 32 and a length substantially equal to the width of the tape 20. It has a plurality of grooves 34, preferably of rectangular shape, formed in its peripheral surface and disposed parallel to the rotational axis of the capstan, forming a series of splines or ridges 36 therebetween. The grooves 34 are substantially co-extensive with the length of the capstan except that at either end they are almost completely closed off by end closures 38. As best seen in FIG. 5A, the end closure 38 has a height slightly less than the depth of the grooves 34 so as to provide a small space or orifice 40 between the underside of the tape and the upper edge of the closure when the tape 20 is in contact with the cylindrical outer surface of the splines 36. In a preferred embodiment, the height of the space 40 is of the order of 0.001 inch. This space can be provided during fabrication of the capstan by milling the slots 34 to a depth of only .001 for a short distance at either end and then increasing the depth throughout the remainder of their length. Alternatively, the slots 34 may be milled to the full length of the capstan and circular end plates having a diameter slightly less than the diameter of the periphery of the splines affixed to the end surfaces of the capstan.

Figure 6:
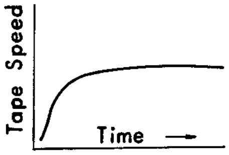
FIG. 6 is a plot of the start characteristic of the capstan of FIG. 5.

The capstan according to the invention has been found to give a fast smooth start characteristic when used as the driving capstan and to offer very little drag to the tape when it is not driving. Its starting characteristic, FIG. 6, shows that the overshoot is eliminated, because, it is believed, the partial closing of the grooves prevents the instantaneous collapse of the air bearing while allowing the air cushion to escape sufficiently rapidly to achieve a fast start. It will be noted that the slope of the start characteristics of FIG. 6 is approximately the same as for the characteristics of FIG. 3, indicating that the air bearing between the tape and the splines collapses substantially instantaneously upon application of air pressure from the manifold allowing the tape to move into contact with the splines, whereas the air bearing in the region of the grooves is discharged a bit more slowly, so as to cushion the tape and limit its depression into the grooves, thereby contributing to a smoother start.

In the non-driving condition, the end closure 38 trap the air in the grooves and confine an air bearing of sufficient thickness to keep the tape clear of the capstan and reduce the drag to substantially zero. It has been found that the capstan of FIG. 5 is approximately equal in effectiveness to a capstan having fully closed grooves for the purpose of minimizing drag on the non-driving capstan.

While some tolerance on the height of the space 40 is allowable, it has been found, quite unexpectedly, that the performance of the capstan is degraded if the opening is made significantly larger. Openings of the size indicated prevent conformance of the tape to the splines and grooves (as indicated in FIG. 2) of the driving capstan, whereas this undesirable condition exists if the opening is only slightly increased in size.

There has been described a capstan construction for a pneumatically driven tape handling system having properties that improve the operation of such systems. The capstan is effective to maintain a suitable air bearing between it and the tape when it is out of driving engagement with the tape, yet allows the air bearing to collapse in a controlled manner, upon application of air pressure to the other side of the tape, to provide fast and smooth starting of the tape. While a preferred embodiment has been shown and described, various modifications will now be apparent to ones skilled in the art. Therefore, it is applicants' intention that the invention not be limited to what has been particularly shown and described, but is to be given the full scope of the following claims.

What is claimed is:

1. For a pneumatic tape transporting system in which the tape is driven by directing air under pressure onto the tape to force it against a continuously rotating capstan, an improved capstan comprising, a dight-circulr cylindrical member having a pluraliy of parallel grooves formed in the peripheral surface thereof and forming therebetween a like plurality of splines, said grooves being oriented parallel to the axis of said member and substantially coextensive with the length of said member, and closure means at each of each of said grooves closing the ends of each of said grooves from the bottom thereof to a height slightly less than the depth of said slots.

2. For a pneumatic tape transporting system in which the tape is driven by directing air under pressure onto the tape to force it against a continhously rotating capstan, an improved capstan comprising, a right-circular cylindrical member of a length at least equal to the width of the tape and having a plurality of parallel grooves of selected depth formed in the peripheral surface thereof and forming therebetween a like plurality of splines, said grooves being disopsed parallel to the axis of said member and of a length approximately equal to the width of said tape, and closure means closing the ends of each of said grooves from the bottom thereof to a height slightly less than the height of said splines, said closure means being dimensioned in the length direction of said member to extend inwardly slightly from the respective edges of the tape to thereby define, with the tape in contact with the peripheral surface of said splines, a restrictive orifice at each end of said grooves.

3. A capstan according to claim 2 wherein the difference between the height of said closure means and the height of said splines is approximately .001 inch.

References Cited by the Examiner

UNITED STATES PATENTS

| | | | |
|---|---|---|---|
| 2,954,911 | 10/1960 | Baumeister | 226—50 X |
| 3,122,295 | 2/1964 | Davison | 226—95 X |

M. HENSON WOOD, Jr., *Primary Examiner.*

R. A. SCHACHER, *Assistant Examiner.*